March 21, 1944.    L. F. CRAWFORD    2,344,602
SHAKER CONVEYER
Filed Nov. 2, 1942    3 Sheets-Sheet 1

INVENTOR.
BY Loyal F. Crawford
Clarence F. Poole
Attorney

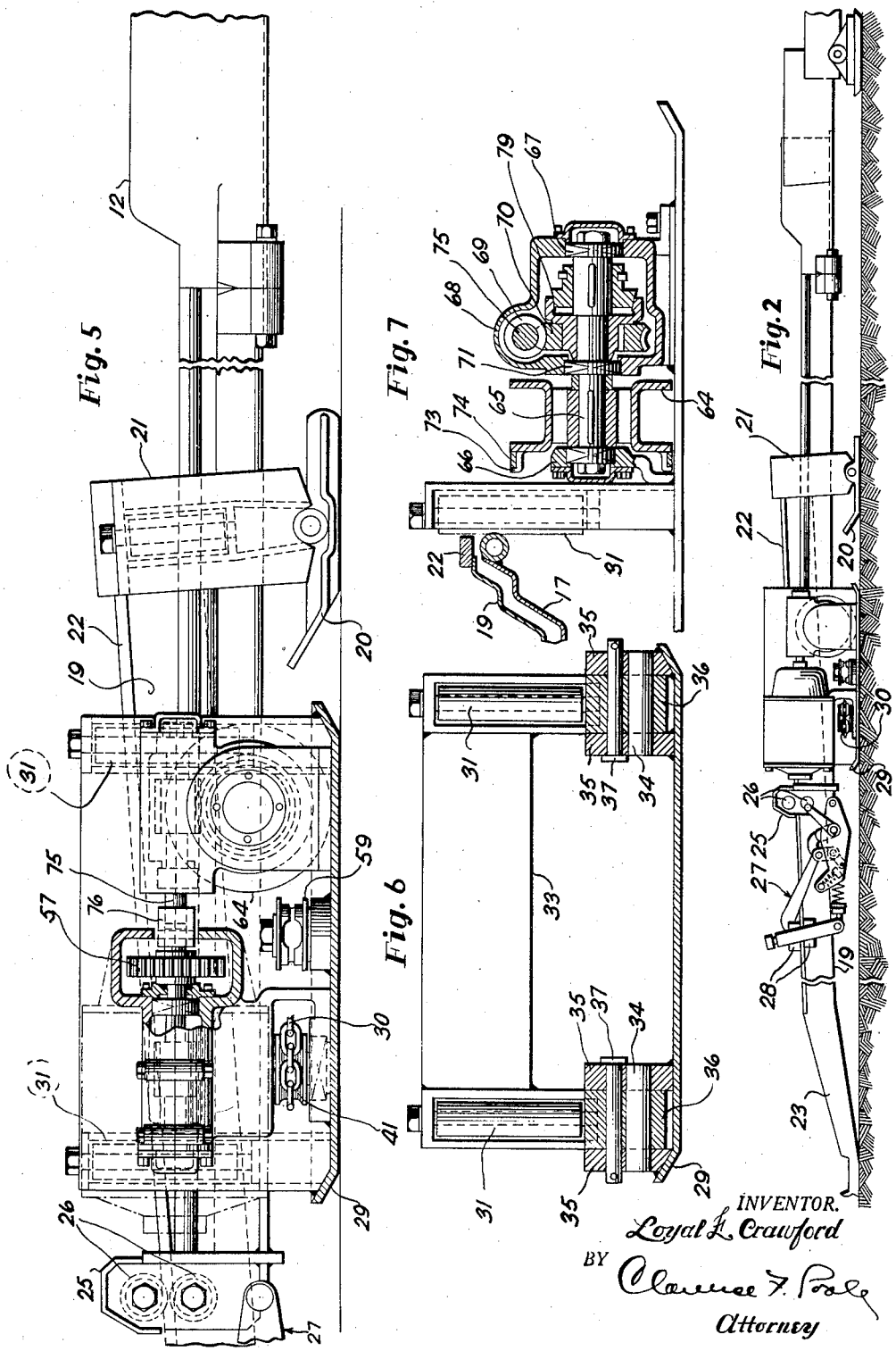

March 21, 1944. L. F. CRAWFORD 2,344,602
SHAKER CONVEYER
Filed Nov. 2, 1942 3 Sheets-Sheet 3
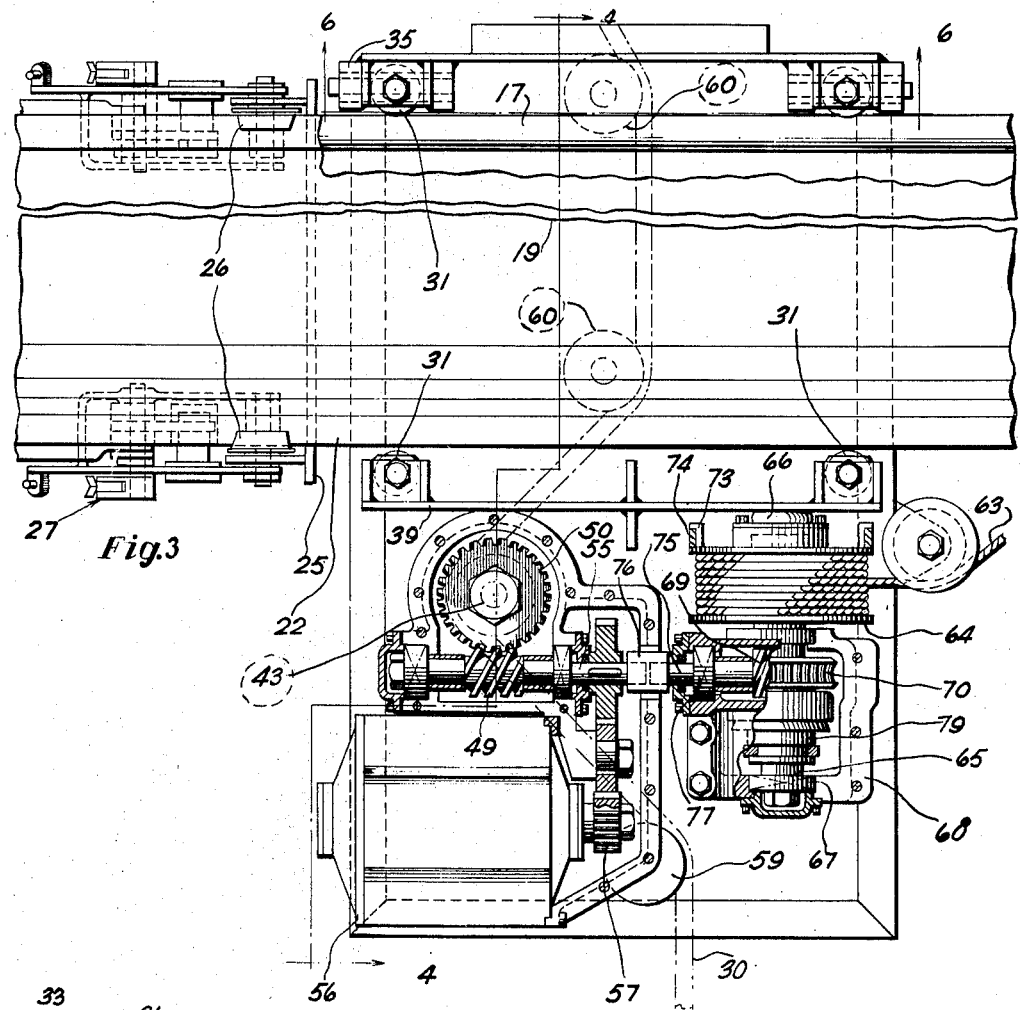
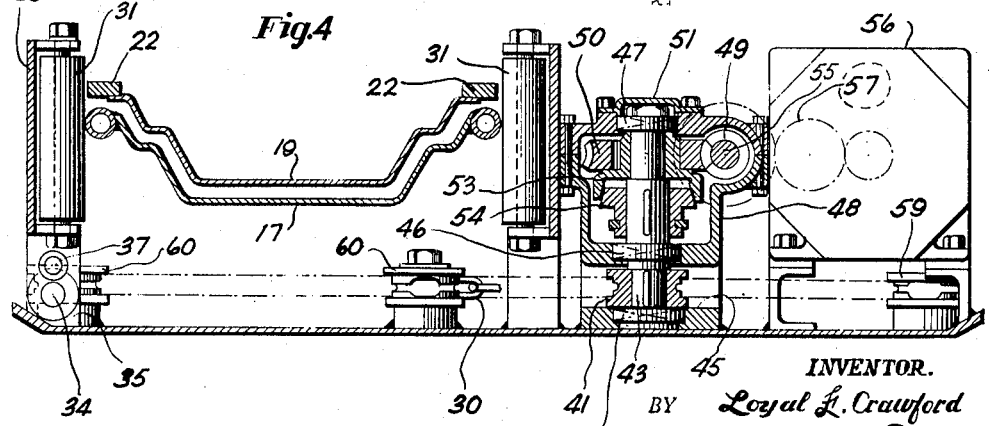
INVENTOR.
BY Loyal L. Crawford
Clarence F. Poole
Attorney Patented Mar. 21, 1944

2,344,602

UNITED STATES PATENT OFFICE 2,344,602

SHAKER CONVEYER

Loyal F. Crawford, Chicago, Ill., assignor to Goodman Manufacturing Company, Chicago, Ill., a corporation of Illinois Application November 2, 1942, Serial No. 464,189

9 Claims. (Cl. 198—220)

This invention relates to improvements in shaker conveyers and more particularly relates to an improved means for swinging the pick-up end of a shaker conveyer laterally during the gather-operation.

The principal objects of my invention are to provide a simplified and improved unitary device for swinging the gathering end of a shaker conveyer from side to side during the gathering operation.

A more specific object of my invention is to provide a power unit independent of the shaker conveyer, for swinging the gathering end of a shaker conveyer laterally during the gathering operation and so arranged as to be readily connected with or disconnected from the gathering end of the shaker conveyer.

Other objects of my invention will appear from time to time as the following specification proceeds and with reference to the accompanying drawings wherein:

Figure 2 is a view in side elevation of the device shown in Figure 1;

Figure 3 is an enlarged detail plan view of the device shown in Figure 1, with certain parts broken away and certain other parts shown in horizontal section;

Figure 4 is a transverse sectional view taken substantially along line 4—4 of Figure 3;

Figure 5 is an enlarged detail view in side elevation of the device shown in Figure 1 with certain parts broken away and certain other parts shown in longitudinal section in order to more clearly illustrate certain details of my invention;

Figure 6 is a longitudinal sectional view taken substantially along line 6—6 of Figure 4; and Figure 7 is an enlarged detail transverse sectional view taken through the holding drum and drive means therefor, for holding the lateral feeding device from movement with respect to the conveyer or for moving it along the trough line.

Figure 1:
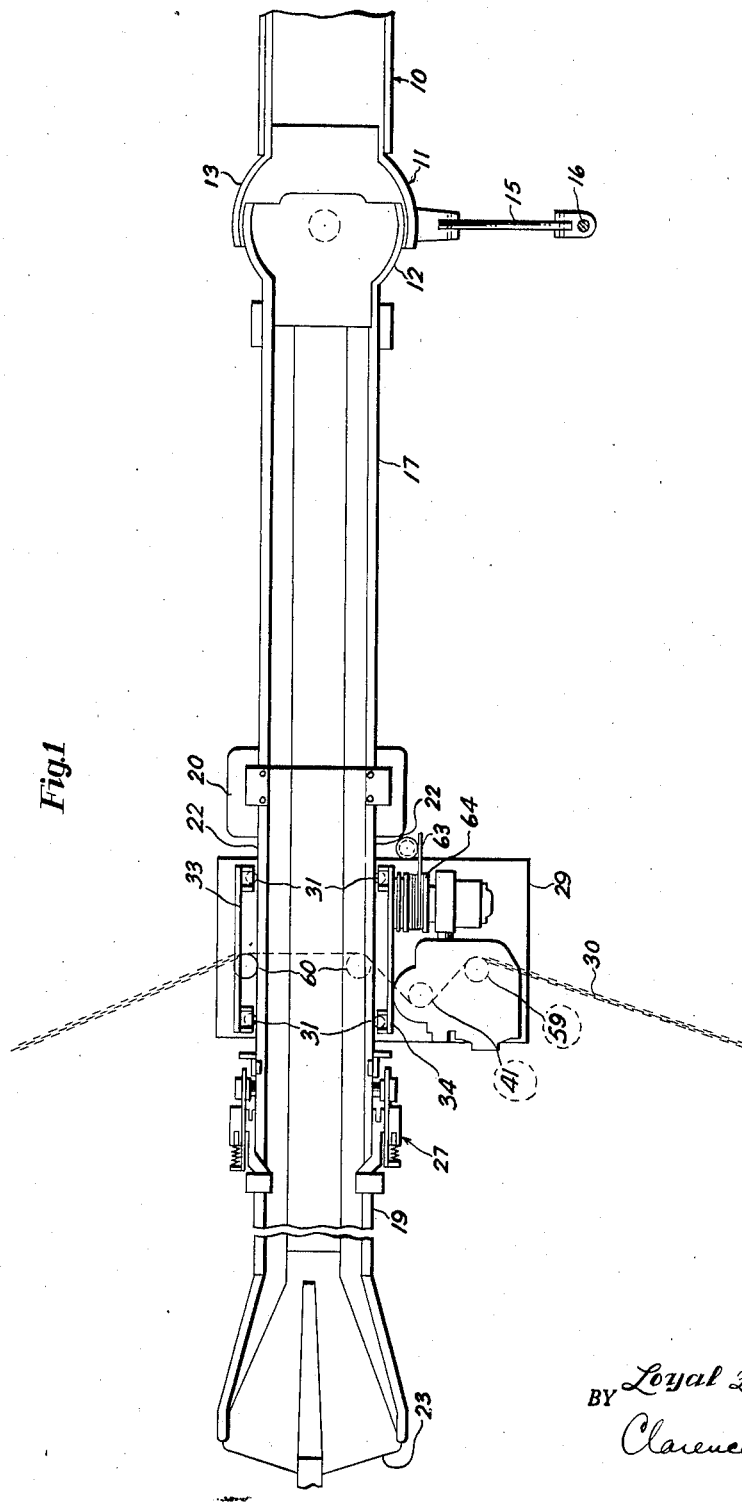
Figure 1 is a top plan view of the inby or pick-up end of a shaker conveyer trough line showing a device constructed in accordance with my invention, for swinging the pick-up end of the conveyer laterally.

In the embodiment of my invention illustrated in the drawings, a shaker conveyer trough line 10 is shown. Said trough line may be reciprocably driven from a usual form of shaker conveyer drive mechanism (not shown), to convey coal from the gathering to discharge end thereof, and includes a swivel 11 having a trough 12 with a widened curved rear or discharged end nested within a correspondingly curved receiving end of a trough 13. A connecting link or pendulum 15 has pivotal connection with said swivel at a point coaxial with the axis of pivotal movement of the trough 12, and is anchored at its free end by means of a jack 16, interposed between said pendulum and the mine roof, so said pendulum will hold said swivel in position but will permit reciprocating movement thereof with the conveyer trough line. Said swivel and pendulum are of a well known form and construction, so need not herein be shown or described further.

A reciprocating trough section 17 is secured to and projects forwardly from the trough section 12 and is mounted at its forward end on an extensible trough section 19, for reciprocable movement therealong. As herein shown, said extensible trough section is mounted above the ground at its rear end on a ground engaging shoe 20, by means of a pair of laterally spaced supporting legs 21, 21, secured to and depending from bearing plates 22, 22, extending along the upper flanges of said extensible trough section and pivotally connected to said shoe at their lower ends. A shovel 23 projects from the forward end of said extensible trough section and rests on the ground at its forward end, for picking up loose material from the ground. The reciprocating trough section is supported on the extensible trough section on a bracket 25 extending across the bottom and upwardly along opposite sides of the forward end of said trough section and having vertically spaced rollers 26, 26 mounted at opposite sides thereof, which ride along the bearing plates 22, 22 and form a slidable support for said reciprocating trough section on said bearing plates.

A feeding device indicated generally by reference character 27 is provided to extend or retract the extensible trough section 19 with respect to the reciprocating trough section 17. Said feeding device is pivotally connected to and projects forwardly from the lower end of the bracket 25, and includes a pair of friction grip blocks 28, 28, adapted to have engagement with the bearing plates 22, 22 during certain strokes of the conveyer, for extending or retracting the extensible trough section 19 with respect to the reciprocating trough section 17. The feeding device herein shown is of the well known friction grip type, similar to that disclosed in Patent No. 2,186,472 which issued to E. R. Bergmann on January 9, 1940, and is no part of my present invention, so need not herein be shown or described in detail.

Referring now in particular to the novel form of device for swinging the extensible and reciprocating trough sections laterally about the axis of the swivel 11, a base plate or shoe 29 is provided, which extends beneath the reciprocating and extensible trough sections 17 and 19, respectively, and is adapted to be laterally moved along the ground by means of a flexible feeding member 30. Said shoe is provided with upturned sides and ends so it will readily slide along the ground, and has two pairs of vertically extending laterally spaced rollers 31, 31, one pair of which extends along each side of said reciprocating and extensible trough sections. Said rollers are adapted to engage the sides of said trough sections, to move said trough sections laterally about the axis of the swivel 11, upon lateral movement of said shoe along the ground.

The rollers 31, 31 adjacent the right-hand side of said shoe, when looking towards the shovel 23, are rotatably mounted on opposite ends of a pivoted side frame member 33. Said side frame member is pivoted for movement about an axis extending longitudinally of the conveyer on longitudinally spaced pivotal pins 34, 34, which extend through parallel spaced lugs 35, 35, secured to and projecting upwardly from the top surface of said shoe and through spaced legs 36, 36 of said side frame member, extending between said lugs. Locking pins 37, 37, adapted to extend through the legs 36, 36 and lugs 35, 35, are provided to lock said side frame member in a vertical position with respect to said shoe and to hold said rollers in an operative position. When it is desired to place the side swinging device in an operative position or to remove it from the trough line, it is only necessary to remove said locking pins 37, 37 and let said side frame member swing downwardly, so the entire shoe may be inserted under or withdrawn from beneath the trough sections 17 and 19. The rollers 31, 31 on the opposite side of the trough sections 17 and 19 from the side frame members, are rotatably mounted in a side frame member 39, which is secured to and projects upwardly from the top surface of the shoe 29.

The means for moving said shoe along the ground and for swinging the reciprocating and extensible trough sections laterally about the axis of the swivel 11 includes the flexible feeding member 30, which is herein shown as being a link chain meshing with and driven from a drive sprocket 41, keyed on the lower end of a vertical shaft 43. Said vertical shaft, as herein shown, is journaled at its lower end in a bearing 44, mounted in a bearing support 45 on the top surface of the shoe 29. Said shaft is also journaled in vertically spaced ball bearings 46 and 47, the bearing 46 of which is mounted adjacent the lower end of a housing 48 for a worm 49 and worm gear 50, and the bearing 47 of which is shown as being mounted in a cover plate 51 for said housing (see Figure 4). The worm gear 50 is keyed to the hub of a clutch member 53 freely mounted on the vertical shaft 43, just beneath the ball bearing 47. Said clutch member may be of any well known form, but is herein shown as being of the friction cone type, and is adapted to be engaged by a frusto-conical driven member 54, feathered on said vertical shaft 43. A suitable system of links and levers (not shown) is provided to engage said engaging member with said clutch member, to selectively drive said vertical shaft 43 from said worm gear 50.

The worm 49 is herein shown as being formed integral with a horizontal worm shaft 55, journaled in said housing and driven from a motor 56 by means of a spur gear train generally indicated by reference character 57.

The flexible feeding member 30 passes from the sprocket 41 in one direction, around an idler sprocket 59 at the left-hand end of the shoe 29, when looking towards the shovel 25, and passes laterally beyond said shoe where it may be secured at its free end to a fixed abutment such as a mine jack (not shown), interposed between the mine floor and the mine roof. Said flexible feeding member likewise passes in an opposite direction from said sprocket 41 and is trained around a pair of laterally spaced idler sprockets 60, 60 disposed beneath the conveyer trough sections 17 and 19 and laterally from said sprockets beyond the shoe 29. The free end of said portion of said flexible feeding member may likewise be secured to a fixed abutment such as a mine jack interposed between the mine roof and the mine floor. The motor 56 is herein shown as being a reversible motor. When the ends of the flexible feeding member 30 are attached to fixed abutments remote from the shoe 29, said shoe will be moved along the ground in one direction, to swing the extensible and reciprocating trough sections in the same direction about the axis of the swivel 11, and when the direction of rotation of said motor is reversed, said shoe will move along the ground in an opposite direction, to reverse the direction of transverse swinging movement of said extensible and reciprocating trough sections.

A means is provided to move the shoe 29 along the reciprocating and extensible trough sections 17 and 19 and to hold said shoe from forward movement during the forward strokes of the conveyer, to prevent it from pounding against the bracket 25. Said means, as herein shown, includes a flexible feeding member 63 adapted to be wound on a winding drum 64 keyed on a transverse shaft 65. Said shaft is mounted at one of its ends in a bearing bracket 66, secured to and projecting upwardly from the shoe 30, and is mounted at its opposite end on a ball bearing 67, mounted in a housing 68 for a worm 69 and worm gear 70. A ball bearing 71 is mounted in the side of said housing opposite from the ball bearing 67, and forms another bearing support for said horizontal shaft.

The winding drum 64 is provided with an inwardly extending flange 73 adapted to be engaged by a friction band 74, to hold said winding drum from rotation and to permit said winding drum and the flexible feeding member 63 to hold the shoe 29 from forward movement during the forward strokes of the conveyer, when the free end of said flexible feeding member is secured to a fixed abutment such as a mine jack interposed between the mine roof and the mine floor.

The drive means to said winding drum from the motor 56 includes a worm shaft 75 coaxial with the worm shaft 55 and connected thereto by means of a coupling 76 (see Figure 3). Said worm shaft is journaled in the housing 68 in spaced ball bearings 77, 77, and, as herein shown, has the worm 69 formed integrally therewith, which meshes with and drives the worm gear 70. A suitable clutch, herein shown as being a friction clutch 79 of the friction cone type, is provided to selectively connect the shaft 65 with said worm gear, to drive the winding drum 64 from said worm gear.

The winding drum 64 and flexible feeding member 63, besides serving to hold the shoe 29 from forward movement during the forward strokes of the conveyer, may likewise serve to move said shoe in a rearward direction during retraction of the extensible trough section of the conveyer. Said flexible cable may also be trained forwardly of said shoe to effect forward movement of said shoe when desired, and may be used to advance the extensible and reciprocating trough sections of the conveyer when it is desired to extend the conveyer by the insertion of another trough therein.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a shaker conveyer and in combination with an extensible trough section having a pick-up member on its forward end, means independent of said trough section for feeding said extensible and reciprocating trough sections laterally, including a shoe separate from said extensible trough section and slidably movable along the ground, power means on said shoe for moving said shoe along the ground, and abutment means on said shoe adapted to extend upwardly along and engage opposite sides of said trough section, for moving said trough section laterally upon lateral movement of said shoe.

2. In a shaker conveyer and in combination with an extensible trough section having a pick-up member on its forward end, means independent of said trough section for feeding said extensible and reciprocating trough sections laterally, including a shoe separate from said extensible trough section and slidably movable along the ground, power means on said shoe for moving said shoe along the ground, a pair of laterally spaced abutment members on said shoe, adapted to extend upwardly along and engage opposite sides of said trough section, for moving said trough section laterally upon lateral movement of said shoe, and one of said abutment members being pivotally mounted on said shoe adjacent its lower end for pivotal movement in a downward direction about an axis extending longitudinally of said extensible trough and means selectively operable for locking said abutment member in a vertical position or for permitting lowering of said abutment member, to permit ready insertion of said shoe beneath or to permit removal of said shoe from said extensible trough section.

3. In a shaker conveyer and in combination with an extensible trough section having a pick-up member on its forward end, means independent of said trough section for feeding said extensible trough section laterally including a shoe slidably movable along the ground, power means on said shoe for slidably moving said shoe along the ground including a flexible feeding member adapted to have an end attached to a fixed abutment remote from said shoe and means for moving said flexible feeding member relative to said shoe, spaced abutment means projecting upwardly from said shoe and adapted to have engagement with opposite sides of said extensible trough section for moving said trough section upon movement of said shoe, and one of said abutment means being pivotally mounted on said shoe for downward swinging movement, to permit said shoe to be readily inserted beneath or withdrawn from said extensible trough section.

4. In a shaker conveyer and in combination with an extensible trough section having a pick-up member on its forward end, means independent of said trough section for feeding said extensible trough section laterally including a shoe separate from said extensible trough section and slidably movable along the ground and having upright abutment means engageable with opposite sides of said trough section, power means on said shoe for moving said shoe and trough sections laterally including a flexible feeding member adapted to have ts ends attached to fixed abutments remote from said shoe, means having operative connection with said flexible feeding member, for moving said shoe along the ground, and means selectively operable to hold said shoe from forward movement with said extensible trough section during reciprocation of the conveyer.

5. In a shaker conveyer and in combination with an extensible trough section having a pick-up member on its forward end, means independent of said trough section for feeding said trough section laterally including a shoe slidably movable along the ground and having engagement with opposite sides of said trough section, power means on said shoe for moving said shoe along the ground including a flexible feeding member adapted to have its ends attached to a fixed abutment remote from said shoe, means having operative connection with said flexible feeding member for moving said shoe along said flexible feeding member, another flexible feeding member, means selectively operable to cause said flexible feeding member to hold said shoe from forward movement with the shaker conveyer, and power driven means having operative connection with said last mentioned flexbile feeding member for causing said flexible feeding member to move said shoe rearwardly along said trough section.

6. In a shaker conveyer and in combination with an extensible trough section having a pick-up member on its forward end, means independent of said trough section for feeding said extensible and reciprocating trough sections laterally including a shoe slidably movable along the ground, power means on said shoe for moving said shoe along the ground, a vertically extending anti-friction member on said shoe on each side of said extensible trough section, for engaging said trough section and for moving said trough section laterally upon lateral movement of said shoe, and one of said anti-friction members being mounted adjacent its lower end adjacent one side of said shoe for selective pivotal movement in a downward direction, to permit ready insertion of said shoe beneath or to permit removal of said shoe from said extensible trough section.

7. In a shaker conveyer and in combination with an extensible trough section having a gathering shovel on its forward end, power feeding means independent of said trough section for feeding said extensible trough section laterally including a shoe slidably movable along the ground and having engagement with opposite sides of said trough section, a flexible feeding member adapted to have its ends attached to fixed abutments remote from said shoe, a motor on said shoe, a sprocket driven thereby and meshing with said flexible feeding member, for moving said shoe along said flexible feeding member, another flexible feeding member, and means driven by said motor for winding in said last mentioned flexible feeding member, to cause said last mentioned flexible feeding member to move said shoe along said trough section.

8. In a shaker conveyer and in combination with an extensible trough section having a gathering shovel on its forward end, power means independent of said trough section for feeding said extensible trough section laterally including a shoe slidably movable along the ground and having engagement with opposite sides of said trough section, a flexible feeding member adapted to have its ends attached to fixed abutments remote from said shoe, a motor on said shoe, a sprocket driven thereby and meshing with said flexible feeding member for moving said shoe along said flexible feeding member, another flexible feeding member, means driven by said motor for winding in said flexible feeding member to cause said last mentioned flexible feeding member to move said shoe along said trough section, and means for causing said last mentioned flexible feeding member to hold said shoe from forward movement during the forward strokes of the conveyer.

9. In a shaker conveyer and in combination with an extensible trough section having a gathering shovel on its forward end, power means independent of said trough section for feeding said trough section laterally including a shoe slidably movable along the ground and having engagement with opposite sides of said trough section, a flexible feeding member adapted to have its ends attached to fixed abutments remote from said shoe, a motor on said shoe, a sprocket driven thereby and meshing with said flexible feeding member for moving said shoe along said flexible feeding member, a winding drum, a flexible feeding member adapted to be wound thereon, a selectively operable drive connection from said motor to said winding drum to cause said winding drum and last mentioned flexible feeding member to move said shoe along the conveyer, and holding means engageable with said drum to hold said winding drum from moving in an unwinding direction and to cause said last mentioned flexible feeding member to hold said shoe from forward movement during the forward strokes of the conveyer.

LOYAL F. CRAWFORD.